W. S. FRAZIER.
AUTOMOBILE BUMPER.
APPLICATION FILED JAN. 2, 1920.
1,338,433. Patented Apr. 27, 1920.
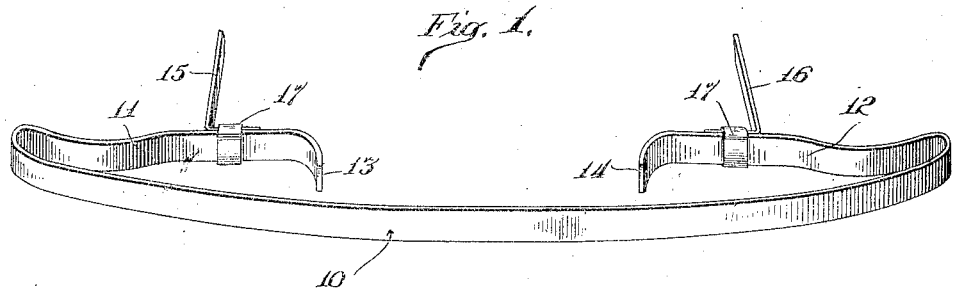
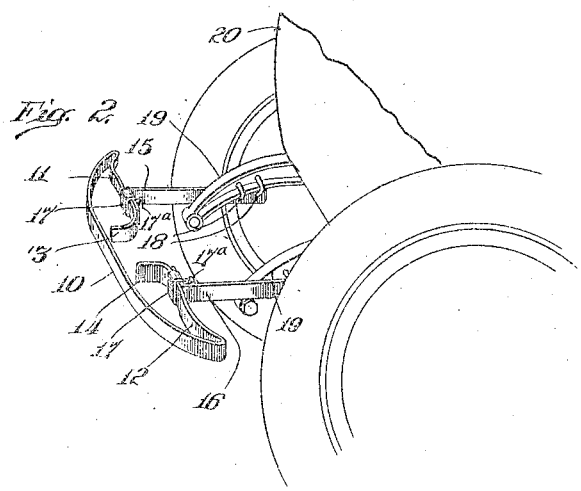
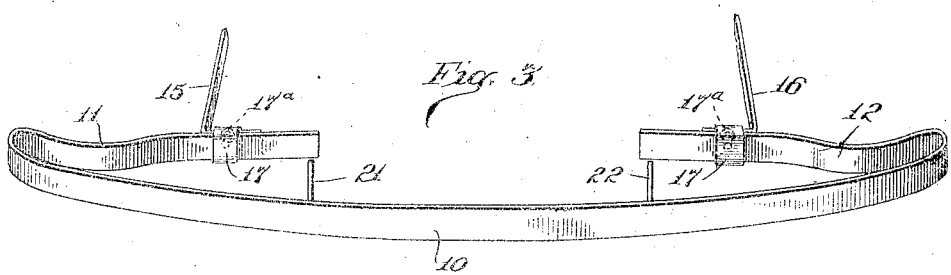
Walter S. Frazier, Inventor
Witness

UNITED STATES PATENT OFFICE.

WALTER S. FRAZIER, OF AURORA, ILLINOIS.

AUTOMOBILE-BUMPER.

1,338,433.

Specification of Letters Patent. Patented Apr. 27, 1920.

Application filed January 2, 1920. Serial No. 348,747.

*To all whom it may concern:*

Be it known that I, WALTER S. FRAZIER, a citizen of the United States, and a resident of Aurora, in the county of Kane and State of Illinois, have invented certain new and useful Improvements in Automobile-Bumpers, of which the following is a specification, reference being had to the accompanying drawings.

My invention relates to bumpers or fenders for automobiles, and it is the object of my invention to provide a new and improved form of bumper, which shall be simple in construction and easy to manufacture without the necessity for extensive machine operations thereon, which shall have a nicely graduated resilient strength to provide the desired yielding to blows of lighter intensity while at the same time having the required rigidity necessary for meeting the heavier blows, and which shall be readily and easily applied to an automobile so as to be maintained properly in position thereon. The preferred means by which I have accomplished my several objects are illustrated in the accompanying drawings and are hereinafter specifically described. That which I believe to be new and desire to secure by Letters Patent is set forth in the claims.

In the drawings,—

Figure 1 is a perspective view of the preferred form of my improved bumper.

Fig. 2 is a perspective view of the device illustrated in Fig. 1 but showing the device in position upon the front end of an automobile which is shown informally and partially broken away.

Fig. 3 is a perspective view showing a modification.

Referring to Figs. 1 and 2 for a showing of my improved form of device, 10 indicates the transversely-extending contact bar of my device which in the construction shown is in the form of a strip of resilient metal bowed out slightly between the ends of the device. At the ends of the bumper, the strip is given a rounded turn inwardly to provide integral inwardly-projecting arms 11 and 12 by which the bumper is mounted upon an automobile, as is hereinafter described. At the inner end of each of the arms 11 and 12, the strip is again given a rounded turn to project directly toward the bar 10, providing thus posts 13 and 14 which stand normally a short distance from the bar 10 and substantially at right angles thereto.

My bumper is secured in position by means of brackets 15 and 16 which are connected to the arms 11 and 12 respectively by means of clips 17 which embrace the arms and the turned ends of the brackets. The brackets 15 and 16 are provided with suitable clips of any approved type for connecting them rigidly with the framework of the automobile, either in front of the automobile or in rear thereof as may be desired. In the construction illustrated, the brackets 15 and 16 are secured by means of hooks 18 to the forward ends of the chassis bars 19 of an automobile 20.

The clips 17 have a sliding fit about the arms 11 and 12 and the turned ends of the brackets and are easily adjustable along the arms so as to permit a ready accommodation of the bumper to different makes of automobile in which the chassis bars or other appropriate parts to which the bumper is to be attached are located at different distances apart. For holding the clips 17 in position upon the brackets 15 and 16 and holding the arms 11 and 12 from moving laterally with respect to the clips, set-screws 17ª of any appropriate type are mounted in the clips adapted to provide the necessary pressure for holding the clips in the desired adjusted position, and serving also to hold the arms from movement with respect to the brackets. By this means, an easy adjustment to as fine a degree as may be desired is always available, and this is effected without the necessity for puncturing the resilient metal strip at any point. In this way I am enabled to provide a bumper of maximum strength with respect to the weight of the strip employed.

In use, when pressure is applied upon the bumper at any point upon its outer face, the bumper is adapted to yield quite readily to any considerable pressure, by reason of the comparatively great length of the resilient bar 10 which is supported only at its outer ends, and further by reason of the resiliency of the arms 11 and 12 and of the curved bar portions at the ends of the bumper. In many cases such moderate firmness of the bumper will be sufficient protection for the automobile, by reason of the yielding of the obstacle, or by reason of the automobile being brought to a stop. In other cases, the pressure is continued until the bar 10 is brought into contact with one or both of the posts 13 and 14, at which time the effective resilient strength of the bumper and the consequent protection afforded thereby are greatly increased as is to be desired.

Referring now to the modified form of device shown in Fig. 3, the bar 10, the arms 11 and 12, the brackets 15 and 16, and the clips 17 are the same as those already described. In this form of device, however, instead of turning the ends of the arms 11 and 12 for providing posts 13 and 14, I have provided posts 21 and 22 fixed in any suitable manner upon the inner face of the bar 10 and adapted to be brought into contact with the straight end portions of the arms 11 and 12 upon the application of the requisite pressure to the bar 10, just as the bar 10 of the construction of Fig. 1 is brought into contact with the ends of the posts 13 and 14 of that construction.

By the use of my improvements, I have provided a construction which can be adjusted easily to fit cars of different frame widths, which is adapted to be held firmly in position by its attaching means, and which is so constructed and arranged that its parts are readily accessible for cleaning, plating, polishing, or enameling. I have also provided a construction by the use of which a moderate initial pressure is applied, but the arrangement of which is such that when a greater effective strength is necessary the parts are reinforced positively for affording the requisite strength.

What I claim as my invention and desire to secure by Letters Patent, is—

1. A bumper for an automobile comprising a transversely-extending resilient bar, arms formed integrally therewith and extending inwardly along said bar, and posts interposed between said arms and said bar substantially at right angles thereto adapted by their contact to support said bar from said arms.

2. A bumper for an automobile comprising a transversely-extending resilient bar, arms formed integrally therewith and extending inwardly along said bar, and a post interposed between the arm at each end of the bumper and said bar substantially at right angles thereto, being supported by one of said parts and standing normally out of contact with the other, said posts being adapted by direct contact between the bar and the arms to afford a positive support from said arms to said bar.

3. A bumper for an automobile comprising a transversely-extending resilient bar, arms formed integrally therewith and extending inwardly along said bar, and posts carried by said arms at their inner ends extending toward said bar substantially at right angles thereto but normally out of contact therewith adapted by contact with said bar to afford a positive support thereto.

4. A bumper for an automobile comprising a transversely-extending resilient bar, arms formed integrally therewith and extending inwardly along said bar, and posts formed integrally with said arms and extending directly toward said bar substantially at right angles thereto but normally out of contact therewith adapted by contact with said bar to afford a positive support thereto.

5. A bumper for an automobile comprising a transversely-extending resilient bar, arms formed integrally therewith and extending inwardly along said bar, and a post interposed between the arm at each end of the bumper and said bar, being supported by one of said parts but normally out of contact with the other part, said post being adapted by pressure applied to said bar to be brought into contact with the part with which it is normally out of contact, such contact being substantially at right angles whereby a positive support is afforded to said bar.

6. A bumper for an automobile comprising a transversely-extending resilient bar, arms formed integrally therewith and extending inwardly along said bar, brackets having turned ends for securing said arms in fixed position with respect to an automobile, clips embracing said arms and the turned ends of said brackets and slidable along said arms, and set-screws carried by said clips adapted to hold the clips from movement out of adjusted position with respect to said brackets and said arms and to hold the arms from movement with respect to the brackets.

WALTER S. FRAZIER.